United States Patent
Einig et al.

(10) Patent No.: US 10,760,745 B2
(45) Date of Patent: Sep. 1, 2020

(54) LED LIGHTING UNIT

(71) Applicant: Lumileds LLC, San Jose, CA (US)

(72) Inventors: Rob Bastiaan Maria Einig, Aldenhoven (DE); Benno Spinger, Aachen (DE)

(73) Assignee: Lumileds LLC, San Jose, CA (US)

(*) Notice: Subject to any disclaimer, the term of this patent is extended or adjusted under 35 U.S.C. 154(b) by 0 days.

(21) Appl. No.: 16/348,858

(22) PCT Filed: Nov. 3, 2017

(86) PCT No.: PCT/EP2017/078188
§ 371 (c)(1),
(2) Date: May 9, 2019

(87) PCT Pub. No.: WO2018/087006
PCT Pub. Date: May 17, 2018

(65) Prior Publication Data
US 2020/0191340 A1    Jun. 18, 2020

(30) Foreign Application Priority Data
Nov. 10, 2016   (EP) ...................................... 16198152

(51) Int. Cl.
*F21K 9/62*      (2016.01)
*F21V 7/28*      (2018.01)
(Continued)

(52) U.S. Cl.
CPC .................. *F21K 9/62* (2016.08); *F21K 9/90* (2013.01); *F21S 43/14* (2018.01); *F21S 43/33* (2018.01);
(Continued)

(58) Field of Classification Search
CPC .... F21K 9/62; F21S 43/33; F21V 7/22; F21V 7/28; F21V 7/30
See application file for complete search history.

(56) References Cited

U.S. PATENT DOCUMENTS 6,234,648 B1 * 5/2001 Borner ...................... F21K 9/64
362/235
7,040,774 B2 * 5/2006 Beeson .............. G02B 19/0019
362/257
(Continued)

FOREIGN PATENT DOCUMENTS

DE          10207585 A1    1/2004
EP           1104870 A2    6/2001
(Continued)

*Primary Examiner* — Julie A Bannan
(74) *Attorney, Agent, or Firm* — Volpe and Koenig, P.C.

(57) ABSTRACT

The invention describes an LED lighting unit comprising a container with a number of partially reflective side walls; a light exit opening defined by the side walls; and a number of light-emitting diodes arranged in the container to emit light of a first color through the light exit opening during an on-state of the lighting unit; characterized in that the material properties of the partially reflective container side walls are chosen to impart a second non-white color to the container side walls, and to absorb light in at least one specific region of the visible spectrum such that light of the non-white second color exits the lighting unit through the light exit opening during an off-state of the lighting unit. The invention further describes a method of manufacturing such an LED lighting unit.

7 Claims, 7 Drawing Sheets

(51) Int. Cl.
| | |
|---|---|
| *F21V 7/24* | (2018.01) |
| *F21K 9/90* | (2016.01) |
| *F21S 43/33* | (2018.01) |
| *F21S 43/14* | (2018.01) |
| *F21V 9/00* | (2018.01) |
| *F21Y 115/10* | (2016.01) |

(52) U.S. Cl.
CPC .............. *F21V 7/24* (2018.02); *F21V 7/28* (2018.02); *F21V 9/00* (2013.01); *F21Y 2115/10* (2016.08)

(56) References Cited

U.S. PATENT DOCUMENTS

| | | | |
|---|---|---|---|
| 8,172,415 B2* | 5/2012 | Wegh | F21S 10/02 |
| | | | 362/231 |
| 9,631,782 B2* | 4/2017 | Harbers | F21K 9/64 |
| 9,810,401 B2* | 11/2017 | Salter | F21V 9/32 |
| 2009/0103293 A1 | 4/2009 | Harbers et al. | |
| 2010/0033948 A1 | 2/2010 | Harbers et al. | |
| 2012/0087105 A1 | 4/2012 | Dai et al. | |

FOREIGN PATENT DOCUMENTS

| | | | |
|---|---|---|---|
| EP | 2784373 A2 | 10/2014 | |
| FR | 2493960 A1 | 5/1982 | |
| WO | 2013160796 A2 | 10/2013 | |
| WO | 2013168101 A2 | 11/2013 | |
| WO | 2015126778 A1 | 8/2015 | |

* cited by examiner

LED LIGHTING UNIT

FIELD OF THE INVENTION

The invention describes an LED lighting unit and a method of manufacturing an LED lighting unit.

BACKGROUND OF THE INVENTION

For many different kinds of lighting applications, it can be appropriate to use an LED lighting unit that has one or more LEDs arranged at the base of a container or "mixing box". The light-emitting surfaces of the LEDs face towards a light exit opening of the container, and the side walls of the container or mixing box are generally highly reflective over the entire visible spectrum so that as much light as possible can exit the container through its light exit opening. The LEDs can be mounted on a lead frame or carrier which may even be flexible, allowing many possible shapes and forms for the lighting unit. For example, several tens of red-emitting LEDs can be arranged on a length of flexible carrier and then formed to follow the curved shape at the back of an automobile so that the curved LED lighting unit may be used as a rear lighting unit that follows the styling lines of the vehicle.

The LEDs and carrier of such a lighting unit may be covered by a translucent filler material such as silicone, effectively filling the mixing box to the level of the light exit opening. The filler material may also include scattering particles or tiny air bubbles so that the lighting unit emits a homogenous light in its lit state. A row of individual LEDs with intervening gaps can then take on the appearance of an uninterrupted line of light. The filler material and any scattering particles can also serve to "hide" the light-emitting surfaces of the LEDs in the unlit state.

With the known LED lighting units of the type described above, the high specular reflectivity of the side walls of the mixing box effectively determine the colour of the lighting unit in its unlit state. This means that conventional LED lighting units generally appear as white or silvery-white since the side walls of the mixing box are effectively mirrors that reflect essentially the entire visible light spectrum in their unlit state. This appearance can be perceived as unattractive, particularly for a vehicle with a colour other than white or silver, since the white lighting unit effectively "interrupts" the overall styling of the vehicle. Furthermore, the filler material has a matte appearance, so that that the entire light exit region appears matte, thereby adding to the unwanted noticeability of the lighting unit in its unlit state.

One way of making the lighting unit less noticeable in the unlit state is to include a coloured bezel around the perimeter of the lighting unit, with a colour that matches the vehicle colour. However, this adds to the overall expense, and the coloured bezel cannot entirely hide the white appearance of the lighting unit.

US 2009/0103293 A1 discloses a light emitting diode illumination device with a light emitting diode and a reflective sidewall surrounding the light emitting diode, defining a mixing cavity and partly provided with wavelength converting material.

DE 102 07 585 A1 discloses an illumination device with a light source in a housing. The inner wall of the housing is provided with reflection elements made of coloured paper.

US 2010/0033948 A1 discloses a lighting module comprising a housing with a light source and a reflector in a cavity of the housing.

Therefore, it is an object of the invention to provide an LED lighting unit that overcomes the problems outlined above.

SUMMARY OF THE INVENTION

The object of the invention is achieved by the LED lighting unit of claim 1, and by the method of claim 11 of manufacturing an LED lighting unit.

According to the invention, the LED lighting unit comprises a container with a number of partially reflective side walls; a light exit opening defined by the side walls; and a number of light-emitting diodes arranged in the container to emit light of a first colour—preferably a non-white colour—through the light exit opening during an on-state of the lighting unit. The LED lighting unit is characterized in that the material properties of the container side walls are chosen to impart a second non-white colour to the container side walls, and to absorb light in at least one specific region of the visible spectrum such that light of the non-white second colour exits the lighting unit through the light exit opening during an off-state of the lighting unit. In the context of the invention, the first colour and the second colour are distinctively different from each other. It should be understood that a "specific region of the visible spectrum" should not be interpreted in terms of absolute or precise boundaries. For reasons that will be known to the skilled person, light absorption over a specific region of the visible spectrum may not be 100% complete, but for the purposes of the invention it is sufficient if the light absorption in such a region is essentially complete or almost complete.

An advantage of the inventive LED lighting unit is that, in its unlit state, the LED lighting unit can have a distinct non-white colour. Furthermore, the material properties of the container side walls do not detract from the intensity of the light emitted from the lighting unit in its lit state. This allows the inventive LED lighting unit to be used in a wide variety of lighting applications in which a non-obtrusive appearance of the lighting unit is desired in its unlit state, even when the LED lighting unit is incorporated or built into an object or device that has an overall non-white colour.

According to the invention, the method of manufacturing an LED lighting unit comprises the steps of constructing a container with a number of partially reflective side walls arranged to define a light exit opening; and arranging a number of light-emitting diodes in the container to emit light of a first colour through the light exit opening during an on-state of the lighting unit. The method is characterized by the steps of choosing the material properties of the container side walls to impart a second non-white colour to the container side walls, and to absorb light in at least one specific region of the visible spectrum such that light of the non-white second colour exits the lighting unit through the light exit opening during an off-state of the lighting unit.

The container side walls can be prepared with relatively little effort to achieve the desired properties, allowing economical manufacture of an LED light unit that has an unobtrusive appearance in its unlit state, even when it is incorporated or built into an object or device that has an overall non-white colour.

The dependent claims and the following description disclose particularly advantageous embodiments and features of the invention. Features of the embodiments may be combined as appropriate. Features described in the context of one claim category can apply equally to another claim category.

The light-emitting diodes can be of any type, for example semiconductor light-emitting diodes, organic light-emitting diodes, or polymer light-emitting diodes. In the following, without restricting the invention in any way, it may be assumed that the light-emitting diodes are solid-state light-emitting diodes. The terms "LED lighting unit" and "lighting unit" may be used interchangeably in the following.

Although the inventive lighting unit can be realised with a single light-emitting diode arranged in a relatively small container, it may be assumed in the following that the lighting unit comprises a plurality of light-emitting diodes, for example several tens of LEDs arranged in regularly spaced intervals on a lead frame or carrier. In a particularly preferred embodiment of the invention, a flexible filler comprising a material such as silicone is arranged to cover the LEDs, and may extend up to the level of the light exit opening. In a further preferred embodiment of the invention, the lead frame and the container are made of flexible material(s) so that the completed LED lighting unit can be formed or shaped as desired. The filler can contain any suitable suspension of scattering particles in order to achieve a desired homogeneity of the light output during the lit state, and to conceal or hide the LEDs during the unlit state of the lighting unit.

In a preferred embodiment of the invention, the LED lighting unit is adapted for use in an automotive rear lighting unit and comprises a plurality of red light-emitting diodes arranged in the container to emit red light through the light exit opening during an on-state of the lighting unit.

In a further preferred embodiment of the invention, with red LEDs arranged in the container, the material properties of the container side walls are chosen to impart a green colour to the container side walls by absorbing light of the visible spectrum in a wavelength range of 380-450 nm and also in a wavelength range of 550-600 nm; and by reflecting the remaining visible light (i.e. light in a wavelength range of 450-550 nm and light with a wavelength greater than 610 nm). The result is an overall "green" appearance of the lighting unit in its unlit state. In other words, when daylight enters the lighting unit through the light exit opening, and reaches a partially reflective side wall, any light with a wavelength in the range of 380-450 nm or in the range of 550-610 nm will be absorbed by the side walls, and only the light with a wavelength in the "green" range or "red" range will be reflected. Therefore, the ambient light leaving the inventive lighting unit after reflection will mainly have the green colour of the side walls. In the lit state of the inventive lighting unit, the light leaving through the light exit opening is simply the red LED colour, since this is not absorbed by the side walls of the container. The intensity of the light emitted by the LEDs may be assumed to be very high relative to daylight, so that any contribution of the ambient light may be disregarded, having no effect on the colour of the light during the lit state of the lighting unit.

To obtain the overall green appearance in the unlit state, the desired reflectivity and absorption of the container side walls can be achieved in a number of ways. For example, the side walls may comprise a material with a suitable combination of pigments. Alternatively or in addition, the container side walls can be coated or covered with a DBR (distributed Bragg reflector) coating applied over an inherently black material to achieve a green appearance of the lighting unit in the unlit state.

In a further preferred embodiment of the invention, the material properties of the container side walls are chosen to impart a yellow colour to the container side walls and to absorb light of a specific region of the visible spectrum in a wavelength range of 410-500 nm. The result is an overall "yellow" appearance of the lighting unit in its unlit state. This can be achieved by applying multiple layers of silicon dioxide ($SiO_2$) and zirconium dioxide ($ZrO_2$) to the container side walls. Alternatively, appropriate combinations of silicon dioxide with one or more of aluminium oxide ($Al_2O_3$), a suitable tantalum oxide, niobium oxide ($Nb_2O_5$) and titanium dioxide ($TiO_2$) can be used.

In a further preferred embodiment of the invention, the material properties of the container side walls are chosen to impart a blue or purple colour to the container side walls by absorbing light of the visible spectrum in a wavelength range of 570-600 nm and by reflecting the light with a wavelength up to 570 nm as well as red light with a wavelength in the range 610-630 nm. The result is an overall "blue" appearance of the lighting unit in its unlit state. For example, if the side walls contain a sufficient quantity of a potassium permanganate ($KMnO_4$) pigment, the resulting lighting unit will exhibit a purple colour in the unlit state.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1A:
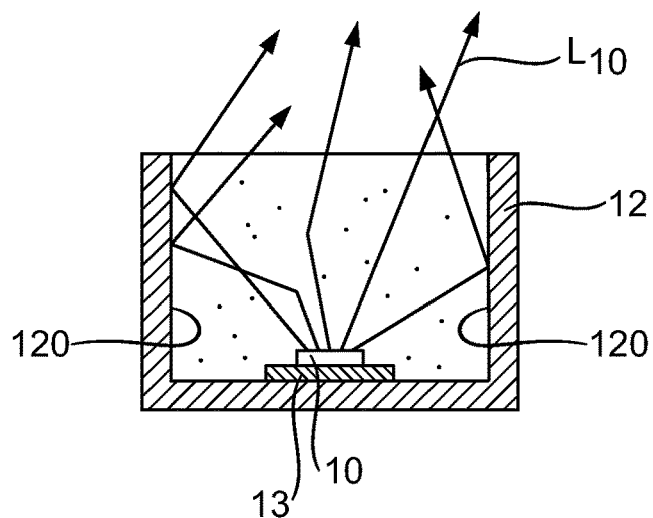
FIG. 1A shows a cross-section of an embodiment of the inventive LED lighting unit in a lit state.
Figure 1B:
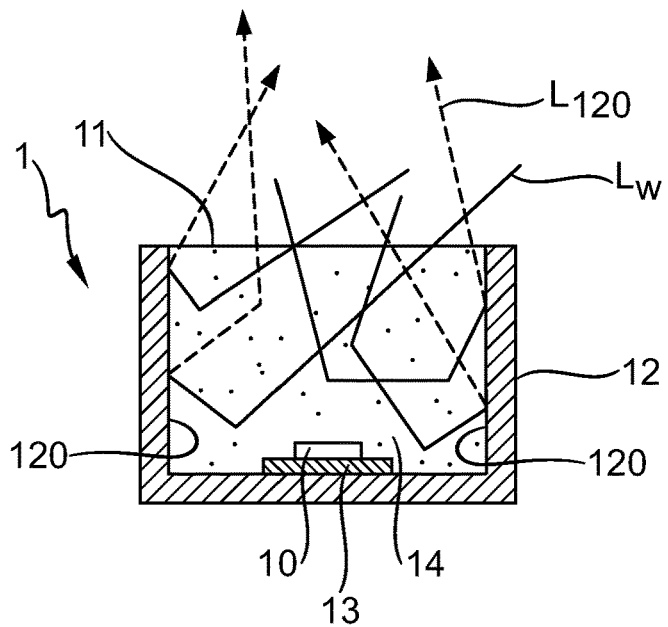
FIG. 1B shows a cross-section of an embodiment of the inventive LED lighting unit in an unlit state.
Figure 1C:
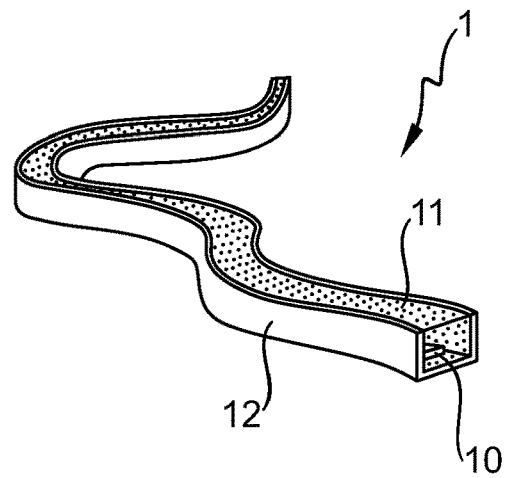
FIG. 1C shows a perspective view of the inventive LED lighting unit.

FIGS. 1A and 1B show a cross-section of an exemplary embodiment of the LED lighting unit 1 according to the invention. The diagrams indicate one of a series of LEDs 10 mounted on a flexible lead frame 13 at the base of a container 12 or mixing box 12. A translucent filler 14 covers the LEDs 10 and lead frame 13, and acts to scatter light in order to achieve a homogenous appearance at the light exit opening 11. Light is reflected from the inside surfaces 120 of the container 12. During the lit state of the lighting unit 1 as shown in FIG. 1A, the LED 10 emits light $L_{10}$ of a certain colour (e.g. red, blue, green). This light exits through the light exit opening of the lighting unit 1 directly, or after reflection at the side walls and/or scattering in the filler 14. The light $L_{10}$ leaving the lighting unit will have the colour of the light emitted by the LED 10. During the unlit state of the lighting unit 1 as shown in FIG. 1B, daylight $L_W$ enters the light exit opening 11 and undergoes reflection at the side walls 120 before exiting the lighting unit 1 again at the light exit opening. To achieve a specific colour $L_{120}$ at the light exit opening in the unlit state of the LED lighting unit 1, the side walls 120 absorb certain wavelengths of the visible light spectrum and reflect the remaining wavelengths, so that the light $L_{120}$ leaving the lighting unit 1 will have the colour of the side walls 120 of the container 12. FIG. 1C shows a perspective view of such a LED lighting unit 1, indicating the flexible construction and the possibility of shaping the lighting unit to follow a curved form.

Figure 2A:
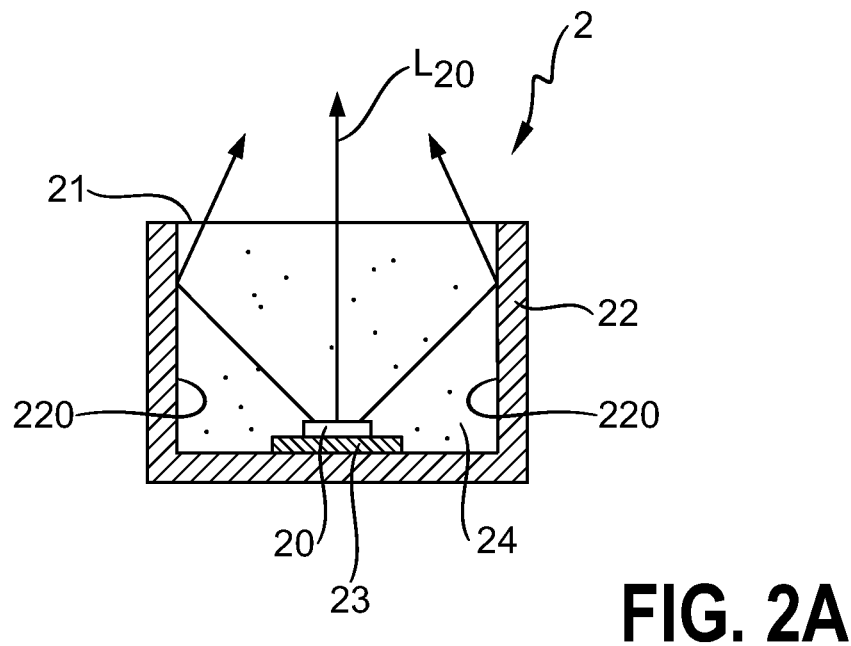
FIG. 2A shows a cross-section of a prior art LED lighting unit in a lit state.
Figure 2B:
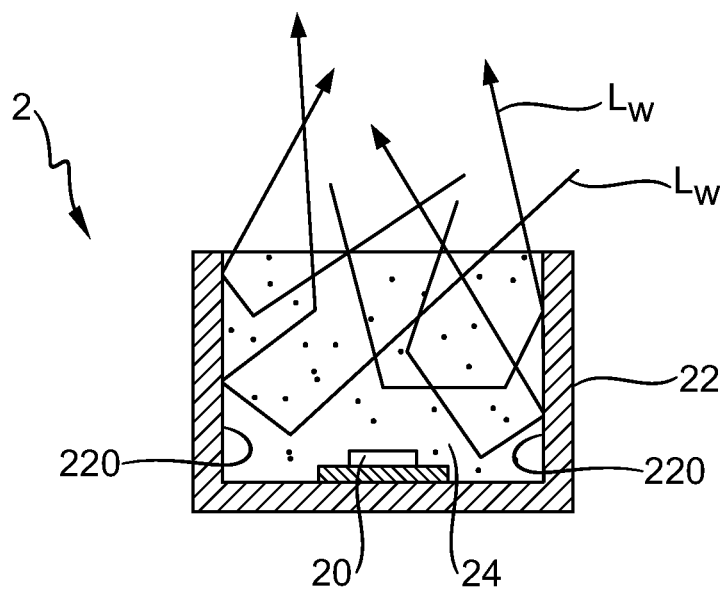
FIG. 2B shows a cross-section of a prior art LED lighting unit in an unlit state.

FIG. 2A shows a cross-section of a prior art LED lighting unit 2 in the lit state. Here also, a flexible lead frame 23 or carrier supports a series of LEDs 20, and a flexible container 22 or mixing box 22 allows the lighting unit 2 to be incorporated in a curved object so that the light exit opening 21 lies flush with the curved outer surface of the object. A flexible filler 24 such as silicone covers the LEDs 20 and may contain a suspension of scattering particles to achieve a homogenous appearance in the lit state. During the lit state of the lighting unit 2, the LEDs 20 emit light $L_{20}$ of a certain colour. This light exits through the light exit opening 21 of the lighting unit 2 directly, or after reflection at the side walls 220 and/or scattering in the filler 24.

In the unlit state, the highly reflective side walls 220 of the container 22 reflect essentially all daylight $L_W$ entering the lighting unit 2, and these side walls therefore impart an overall white or silvery appearance to the lighting unit 2, which can therefore be very noticeable if the object has a colour other than white or silver.

Figure 3:
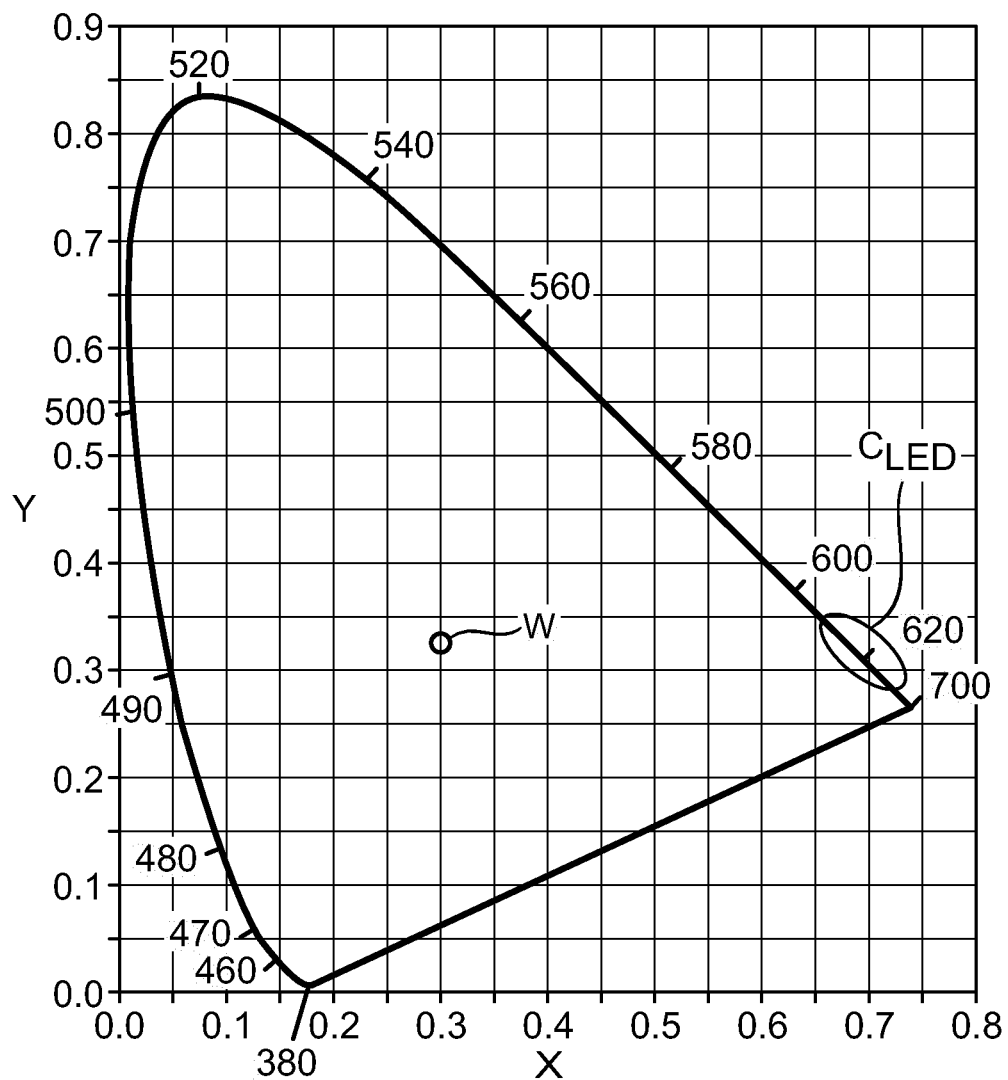
FIG. 3 shows a CIE xy chromaticity diagram.

FIG. 3 shows a CIE xy chromaticity diagram, with wavelengths [nm] of the visible light spectrum along the curved boundary or spectral locus, from 380 (violet) nm to 700 nm (red). The daylight white point W is indicated towards the centre of the diagram, and represents the white colour arising when all wavelengths of the visible spectrum are equally present, which is usually the case in daylight and for light reflected from a white surface.

The light emitted by a coloured LED can be specified by the corresponding wavelength region along the spectral locus. The diagram indicates an exemplary region $C_{LED}$ of the spectral locus that corresponds to the wavelength of light emitted by red LEDs. Such red LEDs may be used in a lighting unit of the type described in the introduction, i.e. arranged along the bottom of a container or mixing box with highly reflective side walls, and with a light exit opening. In its lit state, the lighting unit will appear red over the light exit opening. In its unlit state, the highly reflective side walls of the lighting unit 1 impart an overall white appearance to the lighting unit. However, the colour of the object in which the LED lighting unit is incorporated or installed is not necessarily white. For example, the LED lighting unit may be installed as a rear light in a blue automobile, and the "white" appearance of the lighting unit in its unlit state can therefore detract from the aesthetics of the blue surface in which it is incorporated.

Figure 4A:
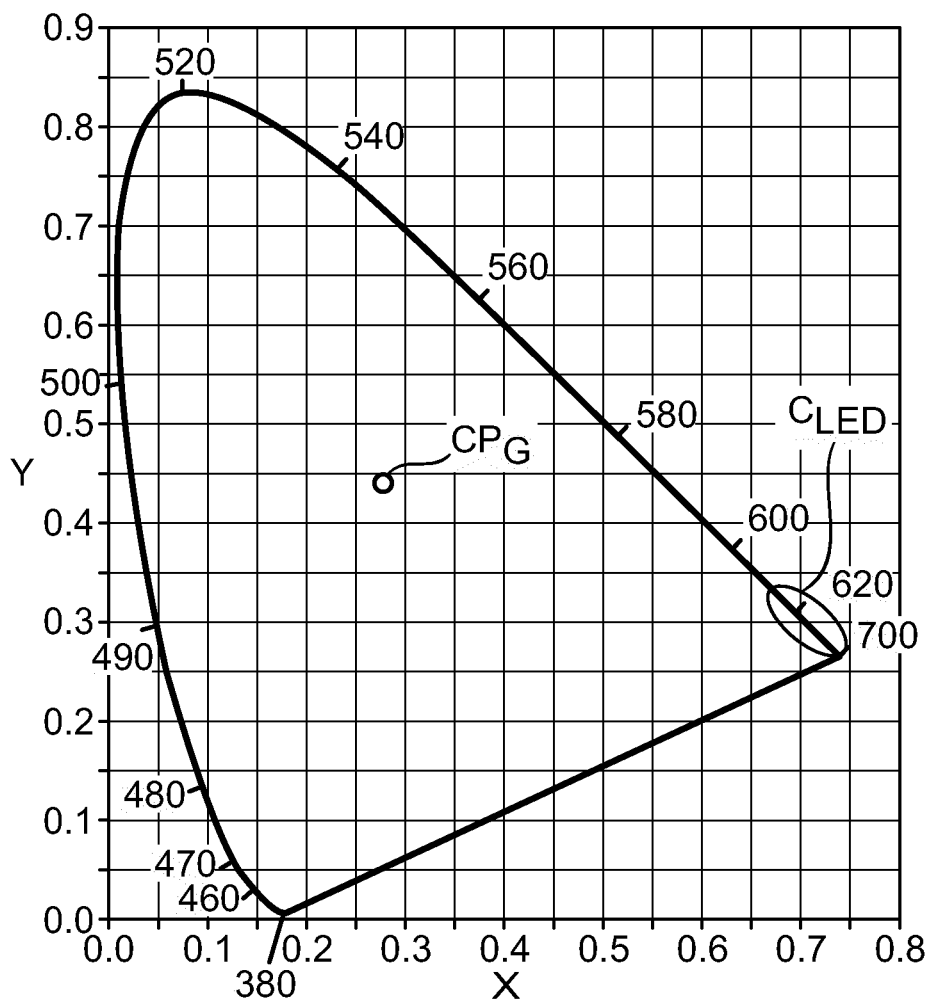
FIG. 4A shows a CIE chromaticity diagram for a first embodiment of the inventive LED lighting unit.

FIG. 4A shows a CIE chromaticity diagram for a first embodiment of the inventive LED lighting unit. In keeping with the preceding drawings, it is assumed that red-emitting LEDs are incorporated in the lighting unit, so that the lighting unit should have an overall red appearance in its lit or "on" state. It may be assumed that the light emitted by the red-emitting LEDs has wavelengths in the region beyond 610 nm.

Figure 4B:
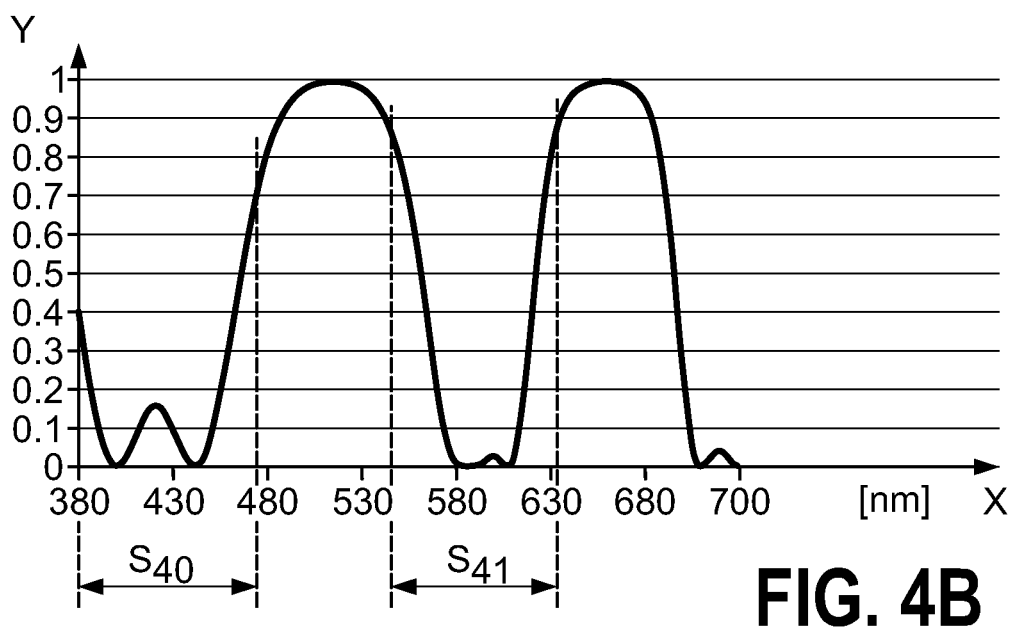
FIG. 4B shows reflectivity of a mixing box of a first embodiment of the inventive LED lighting unit.

In this case, the desired colour point $CP_G$ lies within the green region of the chromaticity diagram, i.e. the LED lighting unit should appear to have that green colour in its unlit or "off" state. This is achieved by the inventive lighting unit by the spectral properties of the material used to construct the container or mixing box. The reflectivity 40 of the mixing box side walls is indicated in FIG. 4B, which shows reflectivity along the y-axis from 0 (complete absorption) to 1 (complete reflection) for the wavelength range 380 nm-700 nm corresponding to the visible spectrum along the x-axis. The graph 40 shows that the mixing box side walls will strongly reflect light with wavelengths in a first region corresponding to 480-530 nm (essentially the entire "green" wavelength region) and also in a second region corresponding to 630-680 nm (the relevant portion of the "red" wavelength region). Light with wavelengths corresponding to the blue and yellow regions of the spectrum are strongly absorbed, as indicated by absorption regions $S_{40}$, $S_{41}$. Since ambient light or daylight generally includes all wavelengths in the visible spectrum, the lighting unit will appear green in daylight when in its unlit state. When the lighting unit is turned on, the purely red light emitted by the LEDs is entirely reflected by the side walls and exits the lighting unit at the light exit opening.

Figure 5A:
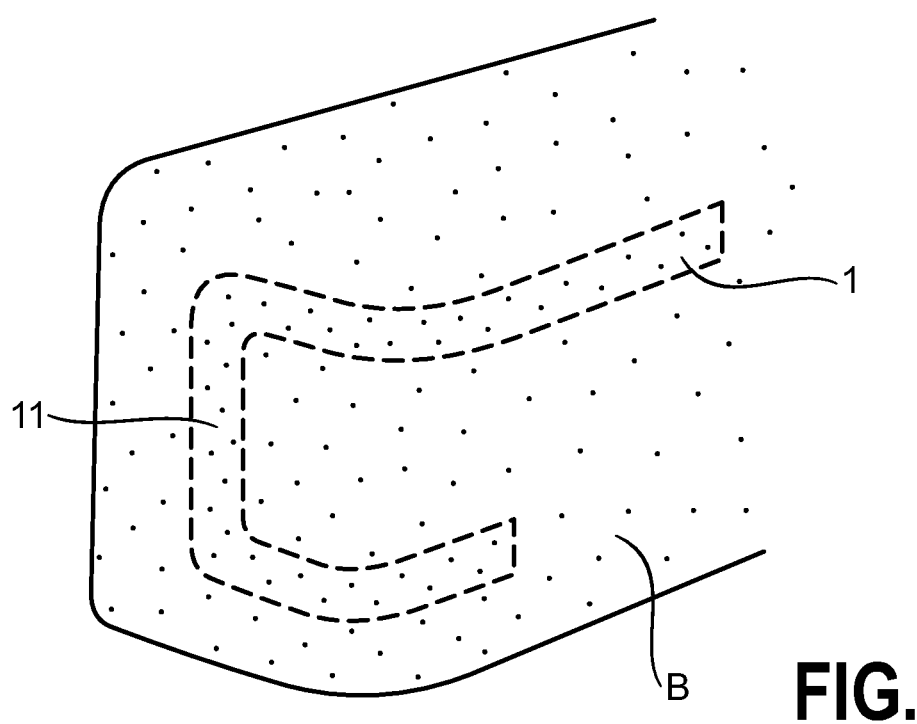
FIG. 5A shows an embodiment of the inventive LED lighting unit in its unlit state.
Figure 5B:
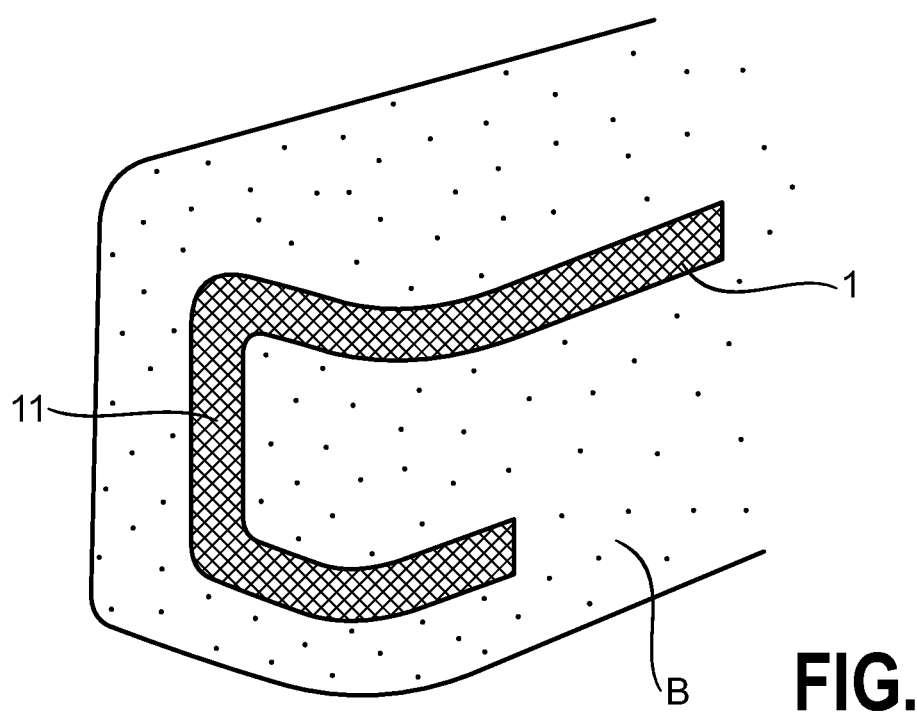
FIG. 5B shows the LED lighting unit of FIG. 5A in its lit state.

This "green" LED lighting unit 1 may be incorporated in an object B with a green colour indicated by the stippling in FIG. 5A. Since the green colour of the lighting unit 1 in the off state (indicated by the stippling) is close to the green colour of the object B in which it is incorporated, the lighting unit 1 is favourably unobtrusive, as indicated by the dotted outline of the lighting unit 1. FIG. 5B shows the LED lighting unit 1 of FIG. 5A in its lit state. Here, the dense fill pattern is used to indicate the intense red light emitted by the LEDs 10 of the lighting unit 1.

Figure 6A:
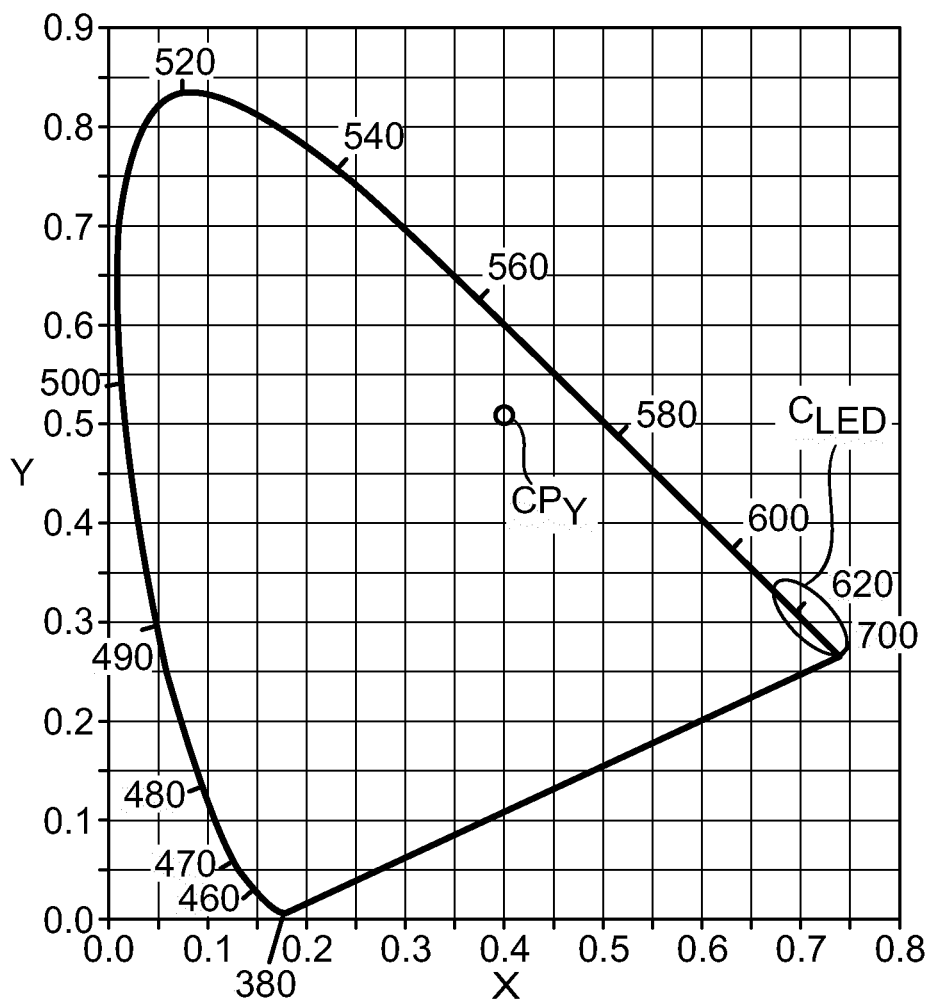
FIG. 6A shows a CIE chromaticity diagram for a second embodiment of the inventive LED lighting unit.
Figure 6B:
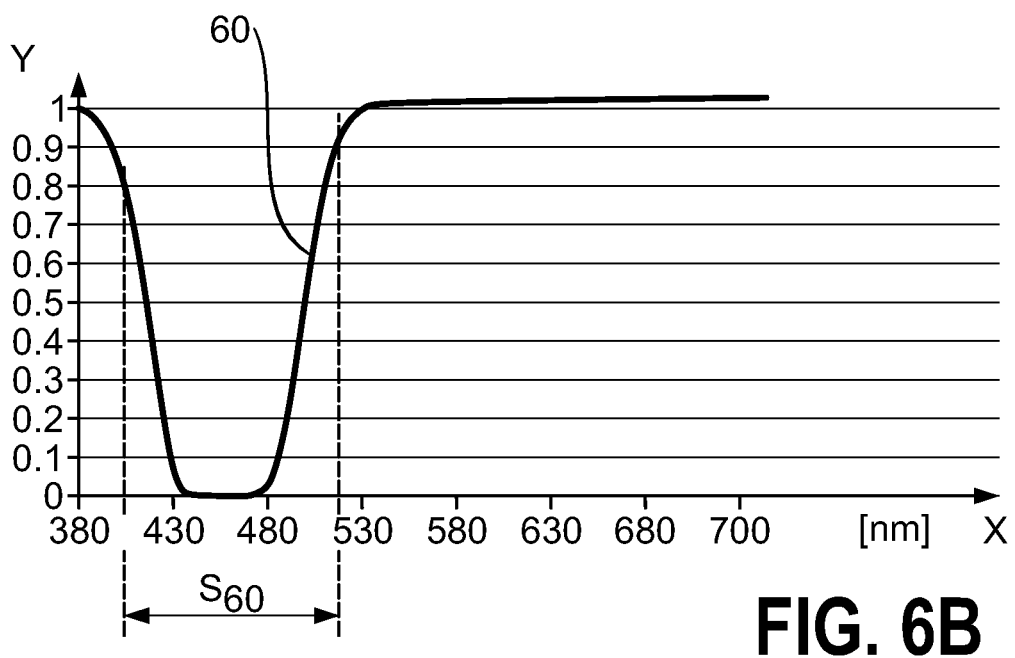
FIG. 6B shows reflectivity of a mixing box of a second embodiment of the inventive LED lighting unit.

FIG. 6A shows a CIE chromaticity diagram for a second embodiment of the inventive LED lighting unit. Here also, it is assumed that red-emitting LEDs are incorporated in the lighting unit. For this embodiment, the desired colour point $CP_Y$ lies within the yellow/orange region of the chromaticity diagram, i.e. the LED lighting unit should appear to have a yellow colour in its unlit or "off" state, and the reflectivity 60 of the mixing box side walls is indicated in FIG. 6B. In this case, the mixing box side walls will strongly reflect visible light with wavelengths exceeding 530 nm. Light with wavelengths corresponding to the blue region of the spectrum is strongly absorbed, as indicated by absorption region $S_{60}$. Since ambient light or daylight generally includes all wavelengths in the visible spectrum, the lighting unit will appear yellow/orange in daylight when in its unlit state. When the lighting unit is turned on, the purely red light emitted by the LEDs is entirely reflected by the side walls and exits the lighting unit at the light exit opening. An embodiment of such a "yellow" LED lighting unit may be incorporated in an object with a yellow colour, in the same manner as explained in FIGS. 5A and 5B above.

Figure 7A:
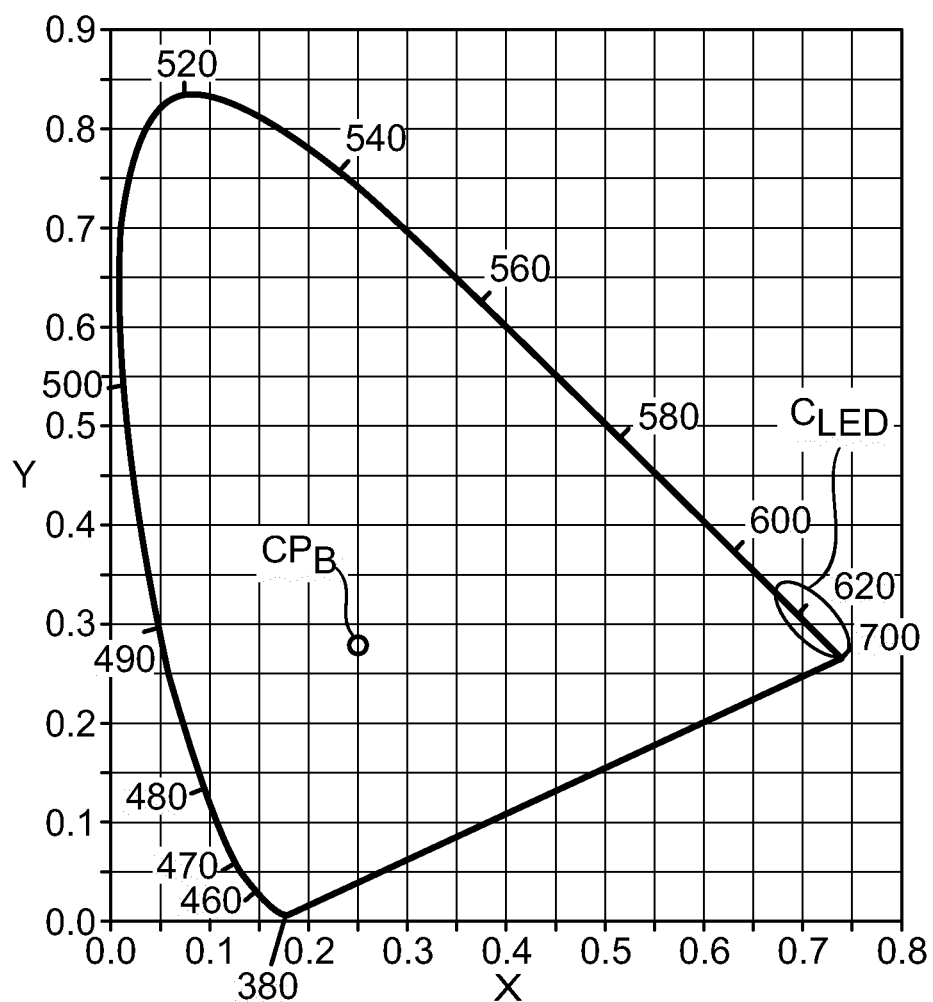
FIG. 7A shows a CIE chromaticity diagram for a third embodiment of the inventive LED lighting unit.
Figure 7B:
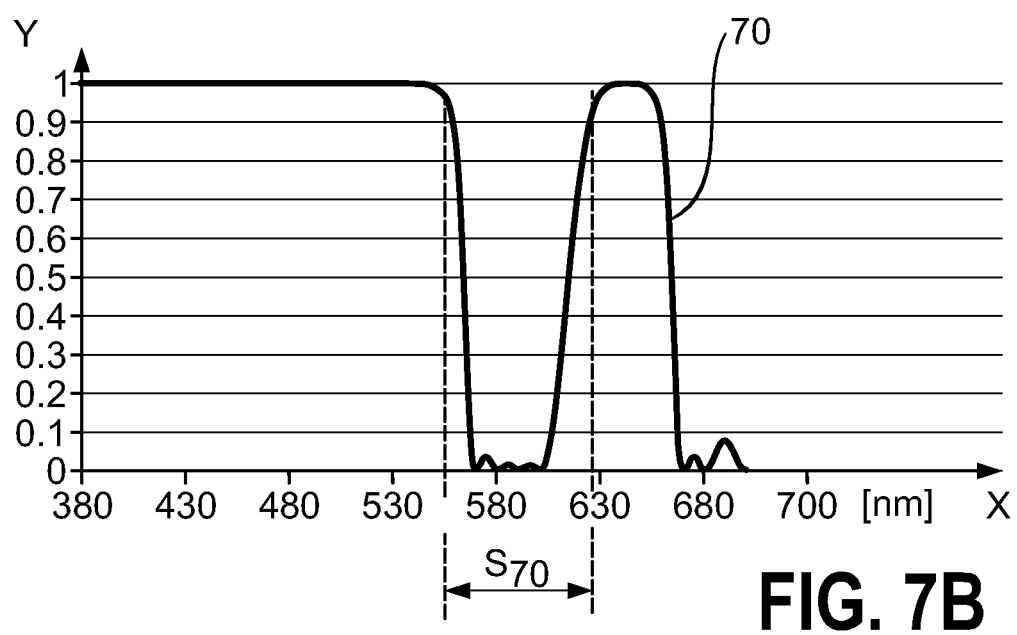
FIG. 7B shows reflectivity of a mixing box of a third embodiment of the inventive LED lighting unit.

FIG. 7A shows a CIE chromaticity diagram for a third embodiment of the inventive LED lighting unit. Here also, it is assumed that red-emitting LEDs are incorporated in the lighting unit. For this embodiment, the desired colour point $CP_B$ lies within the blue region of the chromaticity diagram, i.e. the LED lighting unit should appear to have a blue colour in its unlit or "off" state, and the reflectivity 70 of the mixing box side walls is indicated in FIG. 7B. In this case, the mixing box side walls will strongly reflect the blue/green components of visible light with wavelengths up to 550 nm, and also in a second region corresponding to 630-650 nm (a portion of the "red" wavelength region). Light with wavelengths corresponding to the yellow region of the spectrum is strongly absorbed, as indicated by absorption region $S_{70}$. Since ambient light or daylight generally includes all wavelengths in the visible spectrum, the lighting unit will appear blue/green in daylight when in its unlit state. When the lighting unit is turned on, the purely red light emitted by the LEDs is entirely reflected by the side walls and exits the lighting unit at the light exit opening. An embodiment of such a "blue" LED lighting unit may be incorporated in an object with a blue colour, in the same manner as explained in FIGS. 5A and 5B above.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements.

REFERENCE SIGNS

LED lighting unit 1
prior art LED lighting unit 2
light-emitting diode 10, 20
light exit opening 11, 21
container 12, 22
lead frame 13, 23
side wall 120, 220
filler 14, 24
LED light colour $L_{10}$, $L_{20}$
daylight colour $L_W$
side wall colour $L_{120}$
daylight white point W
red LED wavelength region $C_{LED}$
colour point $CP_G$, $CP_Y$, $CP_B$
absorption region $S_{40}$, $S_{41}$, $S_{42}$, $S_{43}$
reflectivity graph 40, 60, 70
vehicle bumper B

The invention claimed is:

1. An LED lighting unit comprising:
a container with a number of partially reflective side walls;
a light exit opening defined by the side walls; and
a number of light-emitting diodes arranged in the container to emit light of a first color through the light exit opening during an on-state of the lighting unit;
wherein the material properties of the partially reflective container side walls are chosen to impart a second non-white color to the container side walls, and to absorb light in at least one specific region of the visible spectrum such that light of the non-white second color exits the lighting unit through the light exit opening during an off-state of the lighting unit;
wherein the number of light-emitting diodes comprises a plurality of red light-emitting diodes; and
wherein the material properties of the partially reflective container side walls are chosen to impart one of:
a green color to the container side walls and to absorb light of a first specific region of the visible spectrum in a wavelength range of 380-480 nm; and to absorb light of a second specific region of the visible spectrum in a wavelength range of 540-630 nm;
a yellow color to the container side walls and to absorb light of a specific region of the visible spectrum in a wavelength range of 400-520 nm; or
a blue color to the container side walls and to absorb light of a specific region of the visible spectrum in a wavelength range of 550 nm-640 nm.

2. The LED lighting unit according to claim 1, wherein the partially reflective container side walls comprise a Distributed Bragg Reflector coating applied to an underlying black material.

3. The LED lighting unit according to claim 1, wherein the partially reflective container side walls comprise multiple layers of $SiO_2$ and $ZrO_2$ material.

4. The LED lighting unit according to claim 1, partially reflective container side walls comprise a potassium permanganate pigment.

5. The LED lighting unit according to claim 1, comprising a flexible filler arranged to cover the LEDs.

6. The LED lighting unit according to, claim 1, wherein the material of at least the container is sufficiently flexible to impart flexibility to the LED lighting unit.

7. A method of manufacturing an LED lighting unit, which method comprises the steps of:
constructing a container with a number of partially reflective side walls arranged to define a light exit opening; and
arranging a number of light-emitting diodes in the container to emit light of a first color through the light exit opening during an on-state of the lighting unit;
wherein the material properties of the container side walls are chosen to impart a second non-white color to the container side walls, and
absorb light in at least one specific region of the visible spectrum such that light of the non-white second color exits the lighting unit through the light exit opening during an off-state of the lighting unit,
wherein the number of light-emitting diodes comprises a plurality of red light-emitting diodes; and
wherein the material properties of the partially reflective container side walls are chosen to impart one of:
a green color to the container side walls and to absorb light of a first specific region of the visible spectrum in a wavelength range of 380-480 nm; and to absorb light of a second specific region of the visible spectrum in a wavelength range of 540-630 nm;
a yellow color to the container side walls and to absorb light of a specific region of the visible spectrum in a wavelength range of 400-520 nm; or
a blue color to the container side walls and to absorb light of a specific region of the visible spectrum in a wavelength range of 550 nm-640 nm.

* * * * *